(12) United States Patent
Simsek et al.

(10) Patent No.: US 10,369,538 B2
(45) Date of Patent: Aug. 6, 2019

(54) FLOW SYSTEM AND PROCESS FOR PHOTOLUMINESCENT NANOPARTICLE PRODUCTION

(71) Applicant: KUANTAG NANOTEKNOLOJILER GELISTIRME VE URETIM A.S., Istanbul (TR)

(72) Inventors: Eren Simsek, Istanbul (TR); Osman Vedat Akgun, Istanbul (TR); Leyla Dogan, Istanbul (TR); Ibrahim Hocaoglu, Kocaeli (TR); Pinar Dagtepe, Istanbul (TR); Emre Heves, Istanbul (TR); Necip Sezen, Istanbul (TR); Huseyin Tayfun Ruzgar, Istanbul (TR)

(73) Assignee: Kuantag Nanoteknolojiler Gelistirme ve Uretim A.S., Istanbul (TR)

( * ) Notice: Subject to any disclaimer, the term of this patent is extended or adjusted under 35 U.S.C. 154(b) by 0 days.

(21) Appl. No.: 15/393,240

(22) Filed: Dec. 28, 2016

(65) Prior Publication Data

US 2017/0189879 A1 Jul. 6, 2017

Related U.S. Application Data

(60) Provisional application No. 62/273,460, filed on Dec. 31, 2015.

(51) Int. Cl.
*B01J 13/04* (2006.01)
*C09K 11/08* (2006.01)
(Continued)

(52) U.S. Cl.
CPC .............. *B01J 13/04* (2013.01); *B01J 19/004* (2013.01); *C09K 11/08* (2013.01);
(Continued)

(58) Field of Classification Search
CPC ...................... B01J 13/04; B01J 19/004; B01J 2219/00033; B82Y 20/00; B82Y 40/00;
(Continued)

(56) References Cited

U.S. PATENT DOCUMENTS 6,179,912 B1   1/2001   Barbera-Guillem
6,576,155 B1   6/2003   Barbera-Guillem
(Continued)

FOREIGN PATENT DOCUMENTS

WO   2004049522 A2   6/2004
WO   2006027778 A2   3/2006
(Continued)

OTHER PUBLICATIONS

Bharathi,R.N.;Sankar,S.,Mg Doping Effects on the Physical Properties of Lead Sulphide Thin Films,Int.J.ChemTech Res.,Feb. 6, 2015,vol. 7,No. 2,pp. 980-986.
(Continued)

*Primary Examiner* — Shogo Sasaki
(74) *Attorney, Agent, or Firm* — Halit N. Yakupoglu

(57) ABSTRACT

A continuous flow reactor (CFR) system for photoluminescent core shell nanoparticle manufacturing is provided. The CFR system includes a continuous flow reactor (CFR) module, a material supply module, a monitoring module and an automation module controlling the manufacturing process. The CFR module includes a plurality of flow reactors to perform core shell nanoparticle forming reactions, the flow reactors made at least partially of a light transparent material. The monitoring module includes photoluminescence detectors configured to detect radiation emitted from at least one of the core particle material and the core shell material to monitor the core shell nanoparticle forming reactions.

9 Claims, 9 Drawing Sheets

(51) Int. Cl.
  *B01J 19/00* (2006.01)
  *B82Y 20/00* (2011.01)
  *B82Y 40/00* (2011.01)

(52) U.S. Cl.
  CPC ...... *B01J 2219/00033* (2013.01); *B82Y 20/00* (2013.01); *B82Y 40/00* (2013.01); *Y10S 977/773* (2013.01); *Y10S 977/892* (2013.01); *Y10S 977/95* (2013.01)

(58) Field of Classification Search
  CPC .. C09K 11/08; Y10S 977/773; Y10S 977/892; Y10S 977/95
  See application file for complete search history.

(56) References Cited

U.S. PATENT DOCUMENTS

| | | |
|---|---|---|
| 6,682,596 B2 | 1/2004 | Zehnder et al. |
| 7,833,506 B2 | 11/2010 | Rauscher et al. |
| 8,354,090 B2 | 1/2013 | Han et al. |
| 8,540,939 B2 | 9/2013 | Niesz et al. |
| 2005/0129580 A1 | 6/2005 | Swinehart et al. |
| 2008/0112856 A1 | 5/2008 | Stott et al. |
| 2010/0308271 A1 | 12/2010 | Bartel et al. |
| 2011/0042611 A1 | 2/2011 | Weller et al. |
| 2011/0048171 A1 | 3/2011 | Enright et al. |
| 2011/0104043 A1 | 5/2011 | Niesz et al. |
| 2011/0229397 A1 | 9/2011 | Bartel et al. |
| 2012/0001356 A1 | 1/2012 | Chang et al. |
| 2014/0026714 A1 | 1/2014 | Murphy et al. |
| 2014/0264171 A1 | 9/2014 | Schut et al. |

FOREIGN PATENT DOCUMENTS

| | | |
|---|---|---|
| WO | 2009132198 A2 | 10/2009 |
| WO | 2010010329 A2 | 1/2010 |
| WO | 2013079423 A1 | 6/2013 |
| WO | 2014124137 A1 | 8/2014 |
| WO | 2014153266 A2 | 9/2014 |
| WO | 2015138174 A1 | 9/2015 |

OTHER PUBLICATIONS

Pan et al., Automated Synthesis of Photovoltaic-Quality Colloidal Quantum Dots Using Separate Nucleation and Growth Stages, ACS NANO, vol. 7, No. 11, Oct. 16, 2013, 10158-10166.

PCT, International Search Report and Written Opinion of the International Searching Authority for International Application No. PCT/IB2016/001952, dated Jun. 1, 2017. 10 pages.

PCT, International Search Report and Written Opinion of the International Searching Authority for International Application No. PCT/IB2016/001953, dated Jun. 20, 2017. 16 pages.

FLOW SYSTEM AND PROCESS FOR PHOTOLUMINESCENT NANOPARTICLE PRODUCTION

CROSS-REFERENCE TO RELATED APPLICATION

This patent application is related to and claims priority to U.S. Provisional Patent Application Ser. No. 62/273,460 entitled "Flow System and Process for Photoluminescent Nanoparticle Production" filed on Dec. 31, 2015, which is expressly incorporated by reference herein in its entirety.

BACKGROUND

Field of the Invention

The present invention relates to systems and methods for continuous production of nanoparticles and, more specifically, to an automated flow reactor system and flow process to produce high quality core shell photoluminescent nanoparticles.

Description of the Related Art

In technology, batch and flow reactors stand as two common production systems employed worldwide in various chemistry related industries. In flow reactors, in addition to their process continuity advantage, flow channels or flow cells of the reactors can provide more efficient heat and mass transfer than the bulky batch systems. Efficient heat and mass transfer process features coupled with the process continuity can improve product quality while increasing the production rate. Accordingly, in the past 15 years, much attention has been paid to the development of flow reactors that can be used for the mass production of nanoparticles with minimal drawbacks in product quality.

Manually controlled flow reactors can offer wide range of flexibilities in terms of process design by dividing production lines into different reaction segments. In nanoparticle manufacturing, some features employed by the manually controlled flow reactors can often include a number of heating regions used for particle nucleation, growth and shell coating steps for core shell nanoparticle formation; characterization segments including flow cells; and quenching regions to terminate the reactions, and the like. While such features introduce various alternatives in terms of process design, they can also present a different set of challenges because of the need to separately control each parameter on different process segments in such manually operated systems. Although some recently developed flow reactor systems, which are partially equipped with computer controls, provide partial control over such systems, an operator who acts on the computer manually is still needed to make decisions related to the process flow.

Furthermore, the conventional flow reactor systems used in nanoparticle manufacturing often include polymeric or metal tubing with plain interiors as flow cells. Although such flow cells made of polymeric or metal tubing can offer an easy and low cost component for the system, such plain interiors cannot provide adequate mixing of the flowing fluids, which affects the reactions in the flow cells and reduces the quality of the resulting products. Furthermore, such plain interior flow cells can have dead fluid volumes in the production line, leading to material quality problems. Adding to this, opaqueness or inadequate light transparency of such tubing material, which prevent the use of in-line spectroscopic characterization methods, can further exacerbate problems with their applications in conventional flow reactor systems.

There is therefore a need for improved flow reactors and processes using such systems for manufacturing photoluminescent nanoparticles.

SUMMARY

The system of the present invention includes source units having batch reactors for the preparation of each core or shell precursors, connected to vessels for maintaining sufficient amounts of ready-to-dose precursors transferred from the batch reactor to provide the continuity of the production. Each vessel is connected to a dosing line comprised of a liquid dosing pump and a mass flow meter to provide precise control of stoichiometry in the form of relative precursor flow rates.

The system of the present invention also includes radiation transparent flow reactors having special channel geometries which act as a static mixer to ensure efficient mixing of the precursors injected inside by the dosing lines. The radiation transparent flow reactors offer transparency for optical fiber photoluminescence detectors collecting on-line photoluminescence data to provide self-determined intervals for collecting products corresponding to different recipes consecutively run in a single production. Each reactor is equipped with a thermostat so that the temperature of each reactor can be set independently so that the kinetics of different reaction stages such as particle nucleation, growth, shell coating and shell growth can be controlled precisely.

The system of the present invention also includes a quenching unit for effectively terminating the reaction by instant cooling and/or diluting the flowing reaction media.

The system of the present invention also includes a software that provides automated control of all the digital components (thermostats, pumps, flow controllers, actuated valves) in conjunction with temperature, pressure and flow transducers in the process so that a preformed reaction recipe can be imported to run a reaction series of different parameters. The software also includes an algorithm to determine the start of reaction steady state from the photoluminescence data upon a change of set values for process parameters corresponding to a new production recipe so that the production output can be self-determined by the system as waste or target product and collected accordingly.

An aspect of the present invention includes a continuous flow reactor (CFR) system for photoluminescent core shell nanoparticle manufacturing, the system including a continuous flow reactor (CFR) module including a plurality of flow reactors for forming core shell nanoparticles, the flow reactors made at least partially of a light transparent material, at least one core precursor flow path coupled to the (CFR) module, the at least one core precursor flow path delivering at least one core material precursor, including at least one core nanoparticle material, to the CFR module to form core nanoparticles, at least one shell precursor flow path coupled to the CFR module, the at least one shell precursor flow path delivering at least one shell material precursor, including at least one shell material, to the CFR module to form core shell nanoparticles by coating the core nanoparticles with shell, a monitoring module including photoluminescence detectors configured to detect radiation emission from at least one of the core nanoparticles and the core shell nanoparticles to monitor the core shell nanoparticle forming reactions, the photoluminescence detectors configured to detect the radiation transmitted through the light transparent material, and an automation module including a computing device storing a process recipe, the control module being configured to receive at least a radiation data input, from the monitoring module, including radiation emission data detected by the photoluminescence detectors in order to control the core shell nanoparticle forming reactions core shell based on the process recipe.

An aspect of the present invention includes a continuous flow reactor for manufacturing photoluminescent nanoparticles, including a first reactor section having a first flow path, the first flow path being configured to receive a core material solution and form core nanoparticles therein as the core material solution flows through the first flow path, a second reactor section having a second flow path being in fluid communication with the first flow path, the second flow path being configured to receive the core material solution carrying the core nanoparticles from the first reactor section and a shell material solution while blending them to form a core shell material solution from which core shell nanoparticles form as it flows through the second reaction flow path, the first and second reactor sections including transparent walls made of a light transparent material permitting light to transmit through the walls, a plurality of radiation detectors attached to outer surfaces of transparent walls of the first and second reactor sections, the radiation detectors are configured to detect radiation emissions from the core nanoparticles and the core shell nanoparticles as they form in the respective reactor sections, the radiation detectors including photoluminescence detectors, and an automation module for automatically controlling the manufacturing process using a process recipe, the reactor automation module including a computing device having a non-transitory computer-readable recording medium storing computer instructions and the process recipe, the computing device being configured to be in real-time communication with the radiation detectors to receive core nanoparticle radiation data of the first reactor section and core shell nanoparticle radiation data of the second reactor section.

An aspect of the present invention includes a process for manufacturing core shell nanoparticles using a continuous flow reactor system, including providing a continuous flow rector (CFR) module having a first reactor section including a first flow path and a second reactor section including a second flow path coupled to the first flow path, wherein each of the first and second reactor sections includes at least one light transparent wall, providing a computing device for controlling the manufacturing process, the computing device having a non-transitory computer-readable recording medium storing a process recipe program, flowing a core solution, including a core nanoparticle source material, into the first flow path of the first reactor section, growing core nanoparticles in the core solution as the core solution flows through the first flow path, detecting radiation emitted from the core nanoparticles using a first plurality of photoluminescence detectors to qualitatively analyze the core nanoparticles as the core nanoparticles grow in the core solution, the first plurality of photoluminescence detectors being configured to continuously detect radiation transmitted through the transparent walls as the core solution flows through the first flow path, transmitting core nanoparticle radiation data to the computing device, lowering the core solution carrying the core nanoparticles from the first flow path into the second flow path of the second reactor, flowing a shell solution, including a shell material, into the second flow path so as to blend the shell solution with the core solution carrying the core nanoparticles to form a core shell solution in the second flow path, forming core shell nanoparticles by growing shell on the core nanoparticles as the core shell solution flows through the second flow path, detecting radiation emitted from the core shell nanoparticles using a second plurality of photoluminescence detectors to qualitatively analyze the core shell nanoparticles as the core shell nanoparticles grow, the first plurality of photoluminescence detectors being configured to continuously detect the radiation transmitted through the transparent walls as the core shell solution flows through the second flow path, transmitting core shell nanoparticle radiation data to the computing device, and flowing the core shell solution carrying the core shell nanoparticles from the second reactor section to a quenching module to terminate core shell nanoparticle growth to obtain final core shell nanoparticle product.

An aspect of the present invention includes a non-transitory computer-readable recording medium of a control module including a processor, the non-transitory computer-readable recording medium having executable instructions stored thereon for manufacturing photoluminescent core shell nanoparticles in a flow reactor system, including instructions to control at least one core material source and core material feeding unit configured to flow a core material solution to a first reactor section of a continuous flow reactor effective to form core nanoparticles in the core material solution as the core material solution is flowed through the first reactor section and towards a second reactor section, control at least one first photoluminescence detector configured to continuously in-situ detect radiation emitted from the core nanoparticles in the core material solution, as the core material solution flows through the first reactor section, to qualitatively analyze core nanoparticle properties in the core material solution, control at least one first heater configured to adjust temperature of the core material solution to control growth of the core nanoparticles, as the core material solution flows through the first reactor section, based on the detected radiation, control at least one shell material source and shell material feeding unit configured to supply a shell material solution to the second reactor section of the continuous flow reactor to blend with the core material solution flowing from the first reactor section in to the second reactor section and thereby forming a core shell material solution, core shell nanoparticles being formed in the core shell solution as the core shell solution is flowed through the second reactor section and towards a quenching unit, control at least one second photoluminescence detector configured to continuously in-situ detect radiation emitted from the core shell nanoparticles, as the core shell material solution flows through the second reactor section, to qualitatively analyze core shell nanoparticle properties in the core shell material solution, and control at least one second heater configured to adjust temperature of the core shell material solution to control growth of the core shell nanoparticles, as the core shell material solution flows through the second reactor section, based on the detected radiation.

An aspect of the present invention includes a system for kinetically controlling reaction stages of a core shell nanoparticle manufacturing process, including: a processing unit including a glass flow reactor to manufacture nanoparticles, and a quenching module, a monitoring unit including a photoluminescence detector, the photoluminescence detector comprises: optical fiber probes for exciting nanoparticles with a light source, as the nanoparticles are formed in the glass flow reactor, and detecting emission from the nanoparticles to transmit to a photoluminescence detector for photoluminescence analysis, and an optical fiber probe attachment assembly having multiple attachment points on the outer surface of the glass flow reactor so that the photoluminescence analysis is performed along different surface locations of a flow channel of the glass flow reactor, and an automation module having a control software and a process recipe, the automation module being configured to adjust a detected photoluminescence value to a photoluminescence predefined value by adjusting or maintaining temperature of a corresponding reaction stage in the glass flow reactor via corresponding thermostats and by adjusting or maintaining the residence time of flowing nanoparticle precursors in the glass flow reactor via corresponding feeding units, wherein the detected photoluminescence value including a particle photoluminescence property including at least one of a photoluminescence maximum wavelength, full width at half maximum and emission intensity.

An aspect of the present invention includes a method to separate and collect the final production output as selected product or waste by varying process parameters using an automation software, the method comprising: selecting one set of photoluminescence data, detected by photoluminescence detectors, depicted in a graph including at least photoluminescence maximum wavelength, versus time, and mathematically analyzing the photoluminescence data to observe whether the data stays constant or variable over a definite interval to determine whether the definite interval is a reaction steady state or a transition state.

DETAILED DESCRIPTION

Figure 1:
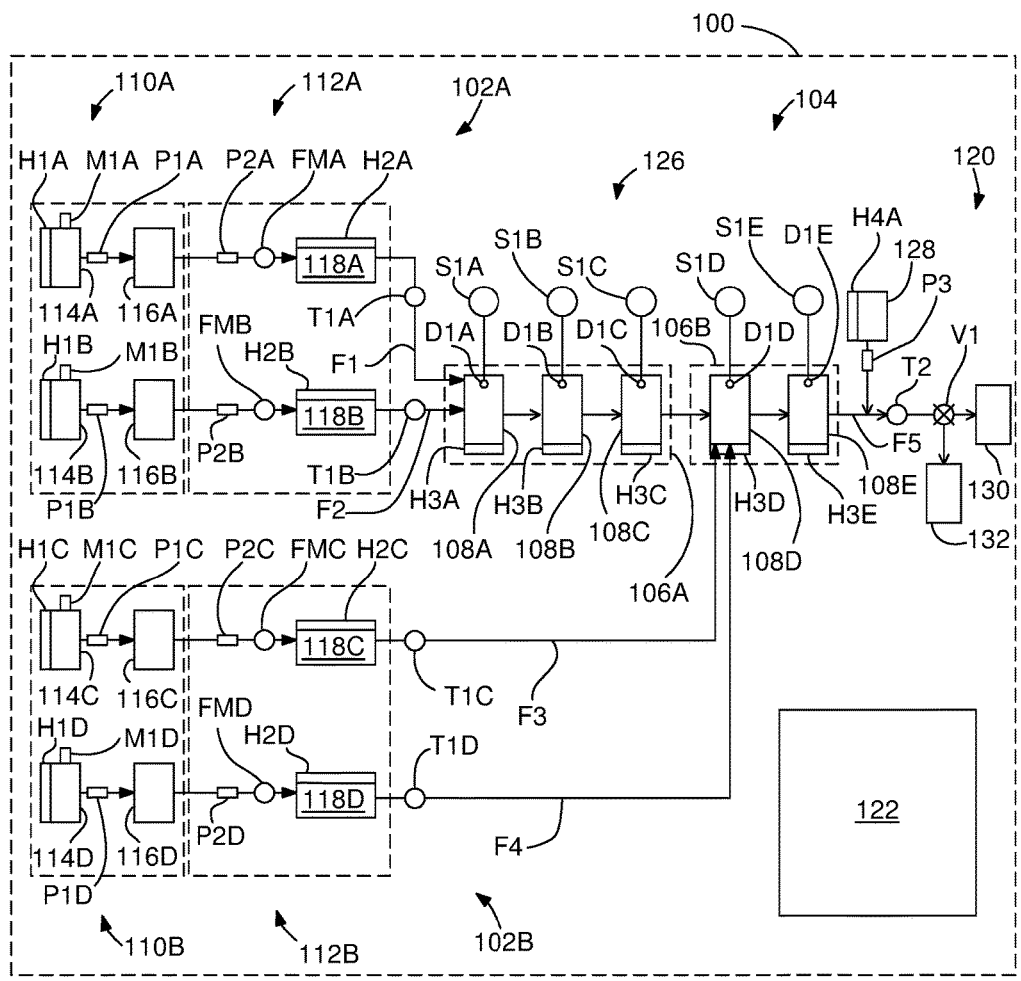
FIG. 1 is a schematic view of an embodiment of an exemplary automated continuous flow system of the present invention.

Before explaining the present method and system in detail, it is to be understood that the method and system may not be limited to the particular embodiments and that they may be practiced or carried out in various processes and in various ways.

The present invention provides a system for manufacturing light emitting nanomaterials and processes for their synthesis. Light emitting nanomaterials may be photoluminescent nanomaterials core shell structured photoluminescent nanoparticles emitting light, for example, in the visible and near infrared (NIR) regions of the electromagnetic spectrum (about 390-2500 nm wavelength range).

The meaning of the term "photoluminescent nanoparticle" in this application may be interpreted broadly to include any semiconductive or metallic nanoparticle material that is capable of emitting light. The particle size of the nanoparticle may be typically about 1 nm to about 100 nm, more typically less than about 2 nm to about 10 nm. The present invention provides an automated continuous flow system and process for manufacturing photoluminescent nanoparticles, preferably core shell nanoparticles. A continuous flow reactor of the invention may be made of a light transparent material such as glass so as to allow radiation emissions generated from the forming nanoparticles to transmit through the glass reactor walls.

In one embodiment, the continuous flow reactor system of the present invention may comprise a continuous reactor module including a core reactor section to form core nanoparticles and a core shell reactor section to form core shell nanoparticles by coating each core nanoparticle with a shell layer. The core reactor section may include one or more core reactors and likewise the core shell reactor section may include one or more core shell reactors, which may be all in fluid communication, i.e. a continuous reaction flow path extends through each reactor section and the reactor while placing them in fluid communication.

A first reaction flow path may extend through the core reactor section. The core reactor section being configured to receive a core material solution from a core material source module and form core nanoparticles within the core material solution as the core material solution flows through the first reaction flow path.

In order to monitor the reactions taking place inside the first reaction flow path, a plurality of photoluminescence detectors attached to outer surface of transparent walls of the core reactor section. The photoluminescence detectors may be configured to continuously receive radiation emitted from the core nanoparticles in the core material solution to continuously monitor and determine core nanoparticle properties, such as nanoparticle crystal growth. The photoluminescence detectors may be configured to continuously receive the radiation transmitted through the transparent walls as the core material solution flows through the first reaction flow path.

A second reaction flow path may extend through the core shell reactor section that is in fluid communication with the first reaction flow path of the core reactor section to receive the core material solution carrying the core nanoparticles from the core reactor section. The Core material solution carrying the core nanoparticles may blend with a shell material solution received from a shell material source module, thereby forming a core shell material solution. The core shell nanoparticles may be formed as the core shell material solution flows through the second reaction flow path.

In order to monitor the reactions taking place inside the second reaction flow path, a plurality of photoluminescence detectors may also be attached to outer surface of transparent walls of the core shell reactor section. The photoluminescence detectors may be configured to continuously receive the radiation emitted from the core shell nanoparticles in the core shell material solution to continuously monitor and determine core shell nanoparticle properties as they form. The photoluminescence detectors may be configured to continuously detect the radiation transmitted through the transparent walls of the section as the core shell material solution flows through the second reaction flow path.

In one embodiment, a computing device of the continuous flow reactor system may have a processor and a non-transitory computer-readable recording medium storing computer instructions to automatically run the photoluminescent core shell nanoparticle manufacturing process.

An advantage of the present invention over the prior art systems may be the employment of glass flow modules including mixing features, which ensure efficient mixing during the whole reaction period The optical fiber photoluminescence detectors collects the photoluminescence data (radiation) directly from the reactor surface without the need of immersing probes into the material solution. The continuous flow reactor system's ability to collect photoluminescence data directly from the reactor surface may also provide an operational flexibility to accommodate above mentioned on-line measurements over any desired location along the reaction flow path.

Another advantage of the present invention is that the process of the present invention may be substantially automated such that all the dosing, mixing and heating components, and the temperature, pressure and photoluminescence monitoring devices may be computer controlled in conjunction with fluid valves, such as actuated valves, to open and close flow paths. Accordingly, the process may be run continuously according to predetermined instructions, thus eliminating any user intervention.

Turning now to Figures, FIG. 1 shows an embodiment of a continuous flow reactor (CFR) system 100, or CFR system 100, of the present invention. The CFR system 100 may include material source modules 102, a continuous flow reactor (CFR) module 104, a quenching module 120 and a control module 122. The material source modules 102 may include a core material source module 102A and a shell material source module 102B, to prepare and supply core precursor solutions including at least one core material and shell precursor solutions including at least one precursor material, respectively, to the CFR module 104 to form core shell nanoparticles.

The CFR module 104 may include one or more reactor sections 106 to process various stages of the core shell nanoparticle formation, such as a core reactor section 106A to form core nanoparticles and a core shell reactor section 106B to coat the core nanoparticles with a shell material to form core shell nanoparticles. The reactor sections 106 may comprise at least one flow reactor for core particle nucleation, at least one flow reactor for core particle growth, at least one flow reactor for shell coating of the core particle and at least one flow reactor for shell growth. In this embodiment, each reactor section 106 of the CFR module 104 may include a plurality of flow reactors 108. The core reactor section 106A may include a first core reactor 108A, a second core reactor 108B, a third core reactor 108C; and, the core shell reactor section 106B may include a first core shell reactor 108D and a second core shell reactor 108E.

The flow reactors 108 of the present invention may be made of light transparent materials, such as glass, for example, high purity borosilicate glass, to monitor reactions in them. The flow reactor bodies may be entirely made of light transparent materials such as glass, or a portion of their body may be made of light transparent materials so as to monitor the reactions in them. Furthermore, each flow reactor 108 may be equipped with a reactor heater H3 or thermostat to adjust temperature of the core and core shell solutions during the synthesis process in the CFR module 104. The reactor heaters H3 may include a first core reactor heater H3A, a second core reactor heater H3B, a third core reactor heater H3C, a first core shell reactor heater H3D and a second core shell reactor heater H3E. The CFR module 104 may include a photoluminescence (PL) monitoring module 126 having a plurality of optic sensors to monitor reactions within the flow reactors 108 through the transparent reaction walls of the flow reactors 108 shown in FIG. 1.

The material source modules 102 may include supply sections 110 and feed sections 112, such as a core supply section 110A and a shell supply section 110B; and, a core feed section 112A and a shell feed section 112B. Each supply section 110 may include one or more source units 114 or source material units, which may be for example precursor batch reactors to prepare precursor solutions including the nanoparticle source materials, and one or more supply units 116, which may be for example dosing vessels or precursor tanks to store ready to supply precursor solutions prepared in the source units 114. Accordingly, the source units 114 may include a first core source unit 114A, a second core source unit 114B, a first shell source unit 114C, a second shell source unit 114D. The supply units 116 may include a first core supply unit 116A, a second core supply unit 116B, a first shell supply unit 116C, a second shell supply unit 116D. The core source units 114A and 114B may be in fluid communication with the core supply units 116A and 116B, respectively; and, the shell source units 114C and 114D may be in fluid communication with the shell supply units 116C and 116D, respectively. Fluid communication may be provided by fluid lines or precursor supply lines connecting the source units to the supply units. Each of the core source units 114A-114B may provide a precursor solution containing at least one material component of a core nanoparticle, such as a cation and/or anion source, to form the core nanoparticles. Each of the shell source units 114C-114D may provide a precursor solution containing at least one component of a shell material, such as a cation and/or anion source, to form the shell layer on the surface of the core nanoparticles.

Accordingly, in one embodiment, the first core source unit 114A may supply a first core precursor solution including a first core material, and the second core source unit 114B may supply a second core precursor solution including a second core material. The first and the second core materials form the compound core of the core shell nanoparticle produced later in the synthesis stage. The first shell source unit 114C may supply a first shell precursor solution including a first shell material and the second shell source unit 114D may provide a second shell precursor solution including a second shell material. The first and the second shell materials form the compound shell of the core shell nanoparticle produced later in the synthesis stage. Alternatively, each of the core source units 114A-114B may provide a precursor solution containing the same component of the core nanoparticles, such as a cation and/or anion source, to form the core nanoparticles. Each of the shell source units 114C-114D may provide a precursor solution containing the same component of the shell materials, such as a cation and/or anion source, to form shell layers on the surface of the core nanoparticles. In the embodiments, although the CFR system 100 is exemplified using two core source units and two shell source units, the system may have more than 2 or less then two core and shell source units to produce core materials and shell materials with more than two materials or less than two materials and such features are within the scope of this invention.

Referring back to FIG. 1, the source units 114 may be equipped with mixers M1 to mix or agitate the components of the prepared precursor solutions. The mixers M1 may include a first core mixer M1A, a second core mixer M1B, a first shell mixer M1C and a second shell mixer M1D. Further each source unit 114 may be also equipped with source heaters H1 or thermostats to provide required heat during the core or shell precursor preparation. The source heaters H1 may include a first core heater H1A, a second core heater H1B, a first shell heater H1C and a second shell heater H1D. Source pumps P1 may pump the precursor prepared in the source units 114 to supply units 116. The source pumps P1 may be liquid transfer pumps coupled to the fluid lines connecting the source and supply units. The source pumps P1 may include a first core pump P1A, a second core pump P1B, a first shell pump P1C and a second shell pump P1D.

The feed sections 112 may include one or more precursor conditioning units 118 or feed units including, for example, preconditioning coils to condition the core and shell precursor solutions received from the supply sections 110. Accordingly, the conditioning units 118 may include a first core conditioning unit 118A, a second core conditioning unit 118B, a first shell conditioning unit 118C, a second shell conditioning unit 118D. The core supply units 116A and 116B may be in fluid communication with the core conditioning units 118A and 118B, respectively; and, the shell supply units 116C and 116D may be in fluid communication with the shell conditioning units 118C and 118D, respectively. The conditioning units 118 may be equipped with conditioning heaters H2 or thermostats to adjust temperature of the core or shell precursor solutions delivered from the supply units 116. The conditioning heaters H2 may include a first core heater H2A, a second core heater H2B, a first shell heater H2C and a second shell heater H2D. The precursor solution from the supply units 116 may be delivered to the conditioning units 118 using supply pumps P2, such as a first core pump P2A, a second core pump P2B, a first shell pump P2C and a second shell pump P2D. The supply pumps P2 may be liquid dosing pumps. The precursor solution pumped by the supply pumps P2 may pass through mass flow meters FM before flowing into the conditioning units 118. The mass flow meters may include a first core flow meter FMA, a second core flow meter FMB, a first shell flow meter FMC and a second shell flow meter FMD. The mass flow meters FM may be sensors measuring the flow rate of the precursor solution pumped to the conditioning units 118 and hence the CFR module 104 connected to the conditioning units 118.

Figure 2A:
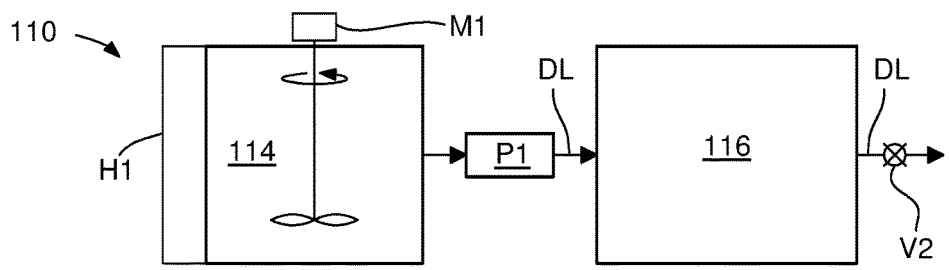
FIG. 2A is a schematic view of an embodiment of an exemplary supply section to supply core or shell precursor solutions.
Figure 2B:
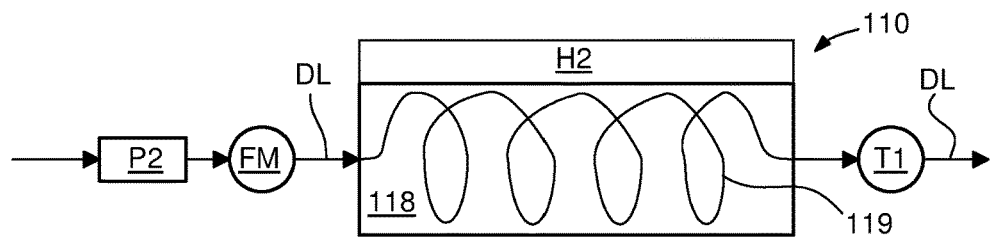
FIG. 2B is a schematic view of an embodiment of an exemplary feed section to feed core or shell precursor solutions.

The conditioning units 118 and the CFR module 104 may be in fluid communication, and the core and shell precursor solutions may be delivered to the CFR module via thermal sensors T1 or temperature transmitters. The thermal sensors may include a first core thermal sensor T1A, a second core thermal sensor T1B, a first shell thermal sensor T1C, a second shell thermal sensor T1D. Precursor flow paths F supply the core and shell precursor solutions to the CFR module 104. The precursor flow paths F may include a first core precursor flow path F1, a second core precursor flow path F2, a first shell precursor flow path F3, a second shell precursor flow path F4 and a product flow path F5. Accordingly, the first core precursor flow path F1 may deliver the first core precursor solution and the second core precursor flow path F2 may deliver the second core precursor solution to the first core reactor 108A of the core reactor section 106A of the CFR module 104. Further, the first shell precursor flow path F3 may deliver the first shell precursor solution and the second shell precursor flow path F4 may deliver the second shell precursor solution to the first core shell reactor 108D of the core shell reactor section 106B of the CFR module 104. It is understood that each precursor flow path F1, F2, F3 and F4 connects the supply sections 110 to the CFR module 104. Each precursor flow path F1, F2, F3 and F4 may include a dosing line DL or precursor dosing line which may be a fluid conduit or line (see FIGS. 2A and 2B). The supply pumps P2, the mass flow meters FM, the conditioning units 118 and the thermal sensors T1 may be coupled to the dosing lines DL as shown in FIGS. 1, 2A and 2B, hence they may also be components of the precursor flow paths F. As will be described below, a product flow path F5 may deliver the solution carrying the manufactured core shell nanoparticles to the quenching module 120.

The photoluminescence (PL) monitoring module 126 may include fiber probes D1 or detectors to collect radiation data through the light transparent material of the flow reactors 108 while the core nanoparticle or core shell nanoparticle synthesis is carried out. The fiber probes D1 may be placed on surfaces of the flow reactors to collect data and analyze using their respective photoluminescence detectors S1. As will be described below, the data collected by the fiber probes D1 and analyzed by the photoluminescence detectors S1 may be transmitted to thee control module 122. Accordingly, the first core reactor 108A includes a first fiber probe D1A connected to a first photoluminescence detector S1A, the second core reactor 108B includes a second fiber probe D1B connected to a second photoluminescence detector S1B, and the third core reactor 108C includes a third optical fiber probe D1C connected to a third photoluminescence detector S1C. Furthermore, the first core shell reactor 108D includes a fourth optical fiber probe D1D connected to a fourth photoluminescence detector S1D, and the second core shell reactor 108E includes a fifth optical fiber probe D1E connected to a fifth photoluminescence detector S1E.

The quenching module 120 may be in fluid communication with the core shell reactor section 106B of the CFR module 104. A quenching solution from a diluent vessel 128 or tank quenches the reactive solution exiting the second core shell reactor 108E via the product flow path F5. The diluent tank 128 may include a diluent tank heater H4A to adjust the temperature of the quenching solution with input from a temperature transmitter T2 or temperature sensor on the product flow path F5. The solution which is stabilized with quenching solution may be sent to either a product tank 130 or a waste tank using a fluid valve V1.

In this embodiment, the control module 122 may be connected, electrically or wirelessly, to the following exemplary system devices for controlling operations of the CFR system 100 including: the heaters or thermostats H1A-H1D, H2A-H2D, H3A-H3E and H4A; the mixers M1A-M1D; the fluid pumps P1A-P1D, P2A-P2D and P3; the thermal transmitters or thermal sensors T1A-T1D and T2; the mass flow meters FMA-FMD; the optical fiber probes D1A-D1E; the photoluminescence detectors S1A-S1E and, the valve V1, and other devices, such as vacuum pumps, oxygen sensors, pressure sensors, and the like to control the process.

The control module 122 which may be configured as a computer or server using a control program including a process recipe, for controlling operations of the CFR system 100, in which a sequence or condition for the manufacturing process of a core nanoparticle or core shell nanoparticle, may be written as a software and readably stored in the control module 122. The process recipe may function as a program for the control module 122 to execute each sequence in the core shell synthesis process performed by the CFR system 100, which will be described more fully below, to obtain a predetermined result.

FIG. 2A shows an exemplary supply section 110 having an exemplary source unit 114 which may be a batch reactor for the preparation of each core precursor solution or each shell precursor solution from their reagents, and an exemplary supply unit 116 which may be a dosing vessel for storing the precursor solutions. Referring to FIGS. 1 and 2A, the batch reactor 114 which may be heated with the thermostat H1 and stirred with the mixer M1, such as an overhead mixer. The batch reactor 114 may be connected to the dosing vessel 116, via the source pumps P1 (liquid transfer pumps), which may be employed to transfer ready-to-use core precursor solutions or ready-to-use shell precursor solutions from the batch reactor 114 to the dosing vessel 116 via the fluid line connecting them. As previously described in the CFR system 100 there may be two core dosing vessels 116A and 116B to receive two core precursor solutions and two shell dosing vessels 116C and 116D to receive two shell precursor solutions. The dosing vessel 116 may comprise liquid level gauges. All the batch reactors 114 and dosing vessels 116 may be also equipped with inert gas feeding units and connected to the vacuum lines to purge the unwanted liquid and air inside and create an oxygen free precursor solutions.

Referring to FIGS. 1 and 2A, all the chemical or physical operations necessary for the preparation of the precursor solutions are performed in the batch reactors 114A-114D at desired temperatures provided by the thermostats H1A-H1D, at desired mixing levels provided by the overhead mixers M1A-M1D, and then transferred to the dosing vessels 116A-116D via the source pumps P1A-P1D, in order to maintain sufficient levels of ready-to-use precursor solutions at the dosing vessels 116A-116D. Such ready precursor solutions in the dosing vessels 116A-116D may be fed to the conditioning units 118 via the dosing lines DL continuously without halting the overall operation.

FIG. 2B shows an exemplary feed section 112 having an exemplary conditioning unit which may a conditioning vessel. Referring to FIGS. 1 and 2B, FIG. 2B shows the feed section 112 including supply pump P2, the mass flow meter FM and the conditioning vessel 118 including the heater H2 and a preconditioning coil 119.

As previously described in the system 100, there may be two core conditioning vessels 118A and 118B for two core precursor solutions and two shell conditioning vessels 118C and 118D for two shell precursor solutions at the feed sections 112A and 112B respectively. Each conditioning vessel 118 may be directly connected to the corresponding supply pumps P2, each of which may be coupled with the mass flow meters FM via the computer control software. As the precursor solutions flow toward the CFR module 104, the mass flow from each batch reactor 114 may be adjusted precisely by the control module 122 by increasing or decreasing the frequency or stroke of the supply pump until the value read from the mass flow meter FM exactly matches a predefined mass flow rate. The temperature transmitter T1 located at the upstream of the preconditioning coil 119 may be coupled with thermostat H2 via the computer control software, to adjust the temperature of the flowing precursor solution in the preconditioning coil 119 before flowing into the CFR module 104. The precursor flow paths F1-F4 shown in FIG. 1 may deliver the core and shell precursor solutions from the dosing vessels 116 to the CFR module 104. The temperature of the precursor solutions flowing into the flow reactors 108 may be adjusted at the conditioning vessels 118 as the precursor solutions flowing through them such that the temperature of the precursor solutions matches the (predefined) reaction temperatures of the flow reactors 108 that receive the precursor solution.

At the beginning of the process, the core precursor solutions meet, mix and react in the first reactor module to start the formation of the core particle via nucleation. For example, if the nucleation temperature of the core nanoparticles is 70° C., the temperature of this first reactor module may be set to 70° C. The temperature of each of the two core precursors is also brought to 70° C. in the preconditioning coils to ensure that they are at the reaction (nucleation) temperature when they meet. The same may be true for the shell precursors. For example, if the shell coating reaction is performed at 60° C., the temperatures of the shell precursors and the corresponding shell reaction module (where the core particle and the shell precursors first meet) may be set to 60° C. This is due to the fact that precursors may react at any temperature depending on their reactivity, but result in different final particle geometry and optical properties according to the reaction temperature. It may generate completely different results if they meet first at a random temperature and then heated to the desired temperature in the reactor.

Figure 2C:
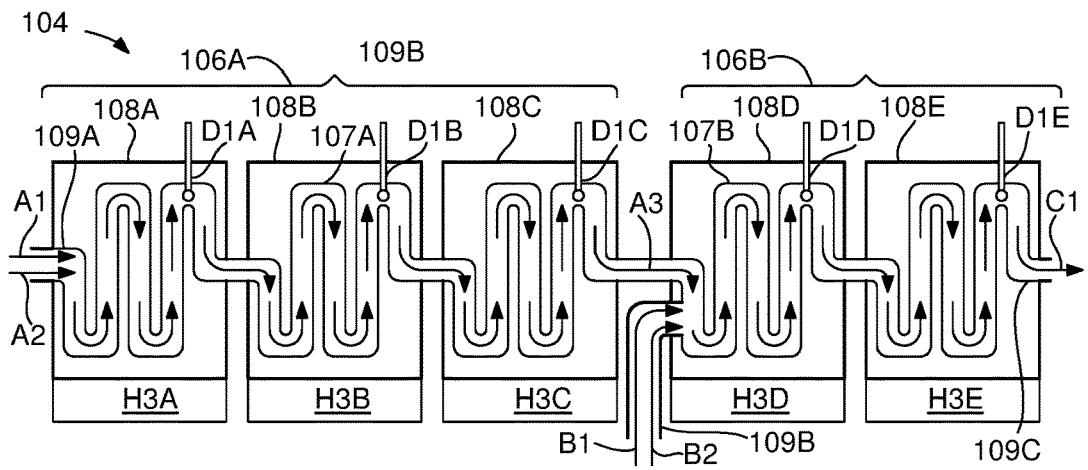
FIG. 2C is a schematic view of an embodiment of an exemplary continuous flow reactor module including reactors.
Figure 2F:
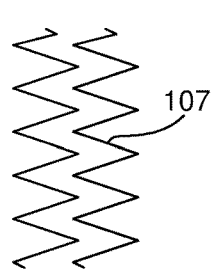
FIG. 2F is a schematic view of an exemplary magnified portion of a flow path within the continuous flow reactor module.

Referring to FIGS. 1, 2C and 2F the continuous flow reactor module 104 may comprise the flow reactors 108 that may be made of high purity borosilicate glass having a reaction channel 107 or reactor flow path, which may be a continuous non-linear channel design that may function as a static mixer. FIG. 2F illustrates an embodiment of the non-linear channel design having a wavy, zigzagged or uniquely featured flow path defined by the shape of the walls or inner surfaces of the non-linear channel. Channel geometry may act as a static mixer to ensure efficient mixing of the precursors injected inside by the dosing lines. Frequency of the geometric features may be in the millimeter or centimeter scale. The special geometry of the reaction channel may affect the flow dynamics of the solutions and enable efficient solution mixing, without dead volumes, increasing the efficiency of the reactions. Differing from the smooth, or featureless, channels of the prior art, this geometry of the channel 107 may provide efficient mixing of the precursors while they react with each other all along the path from each flow reactor entrance to the exit. The number of the flow reactors 108 may be determined according to the desired production capacity (the total flow rate at the flow reactor outlet) for a certain production recipe describing a fixed reaction residence time necessary for the completion of the reaction(s). Accordingly, in this embodiment, the reaction channel 107 may extend through the flow reactors 108A-108E from a first reactor inlet 109A at the core reactor section 106A to a reactor outlet 109B.

During a process, the core nanoparticles may nucleate and grow within a first reaction section 107A and the core shell nanoparticles may form and grow within the second reaction section 107B of the reaction channel. The first reaction section 107A may extend through the flow reactors 108A-108C. The second reaction section 107B may extend through the flow reactors 108D-108E. The core precursor solutions, a first precursor solution A1 and a second precursor solution A2 from the precursor flow paths F1 and F2 may be received by the inlet 109A at the flow reactor 108A and blend as they enter the first reaction section 107A of the reaction channel 107. During core nanoparticle forming reaction, core nanoparticles may nucleate in the first flow reactor 108A, and the core nanoparticles may grow within the second and third flow reactors 108B and 108C. A core solution A3 carrying the core nanoparticles may exit first reaction section 107A at the flow reactor 108C and may enter the second reaction section 107B of the reaction channel 107 at the flow reactor 108D.

The shell precursor solutions, a third precursor solution B1 and a fourth precursor solution B2 from the precursor flow paths F3 and F4 may be received by the inlet 109B at also the flow reactor 108D and blend with the core solution A3 as all three solutions enter the second reaction section 107B of the reaction channel 107. During the core shell nanoparticle forming reaction, shell material begins nucleating on the core-nanoparticles brought by the core solution A3 and coating nanoparticles in the fourth flow reactor 108D, and the core shell nanoparticles may fully form within the fifth flow reactor 108E. A core shell solution C1 carrying the core shell nanoparticles may exit the CFR module 104 at the outlet 109C and may enter the product flow path F5 towards the quenching module 120. The temperature inside the light transparent or glass reactors may be controlled by the thermostats H3A-H3E or heaters so that different temperatures may be applied for particle nucleation, growth and shell reactions.

The process can be employed for the production of photoluminescent or photoluminescent nanoparticles or nanocrystals of group II-VI compound, a group of III-V compound, a group of IV-VI compound, a group of III-VI compound, a group of V-VI compound or a group I-III-VI compound and combination thereof. The first core precursor may include a metal cation such as Cd, Pb, Zn, and the second core precursor may include a non-metal anion such as S, Se, Te, where the first and second core precursors form a core nanoparticle such as CdS, CdSe, CdTe, PbS, PbSe, ZnTe. The first shell precursor may include a metal cation such as Cd, Zn, Hg, and the second shell precursor may include a non-metal anion such as S, Se, Te, where the first and second shell precursors form a shell structure such as ZnS, CdSe, HgS. Together they may form core shell nanoparticles such as PbS/CdS, CdTe/CdS, CdSe/ZnS.

Figure 2D:
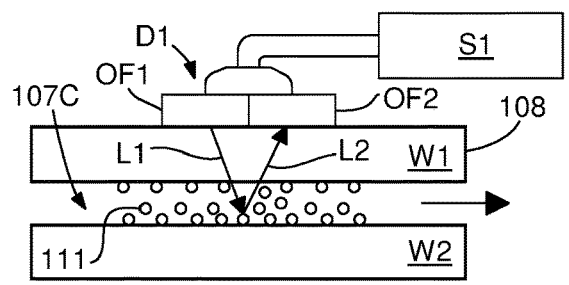
FIG. 2D is a schematic view of an exemplary photoluminescence detector used in the system.

Referring to FIGS. 1, 2C and 2D, in the photoluminescence monitoring module 126, the optical probes D1A-D1E or the optical sensors may be attached to photoluminescence detectors S1A-S1E, which collect data on each glass flow reactor 108 to be analyzed via photoluminescence detectors and transmit the collected date to the computer control module. The optical probes D1 may be fiber probes as further shown in FIG. 2D. The flow reactor also comprises probe attachment devices installed on the flow reactors to be able to collect data from a desired segment of the reaction channel 107 between the inlet 109A and the exit 109C.

FIG. 2D schematically illustrates the operation of the optical probe D1 placed over a reaction channel segment 107C of the flow reactor 108 having transparent or glass walls W1 and W2 defining the reaction channel segment 107C. The optical probe D1 may be placed adjacent or on the surface of one of the transparent walls W1 and W2. In one embodiment the optical probe D1 may be a fiber optical probe having a plurality of light emitting fibers OF1 and light detection fibers OF2. As shown in FIG. 2D, light L1 from the light emitting fiber OF1 may transmit through the transparent wall W1 and excite nanoparticles 111 flowing through the channel segment 107C. The radiation L2 emitted by the nanoparticles 111 may transmit through the transparent wall W1 and detected by the light detecting fiber OF2 of the optical probe D1. Collected radiation data analyzed at the photoluminescence detector S1 and the result about the optical property of the nanoparticles 111 may be transmitted to the control module 122.

Figure 2E:
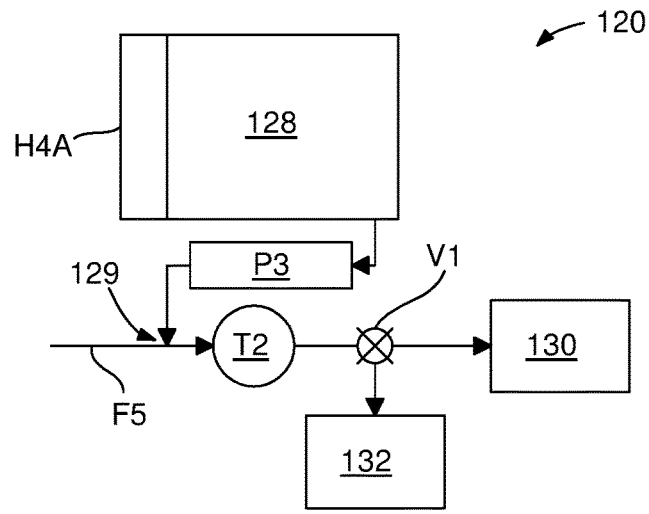
FIG. 2E is a schematic view of an exemplary quenching module of the system.

Referring to FIGS. 1, 2C and 2E, the reaction quenching unit 120 may transform the reactive media carried by the core shell solution C1 from the outlet 109C of the continuous flow reactor 104 into stable dispersions of nanoparticles which can be collected as final product and stored safely. The diluent vessel 128 or tank of the unit 120 may be equipped with the thermostat H4A or heater to maintain a cold diluent anytime during the process. The pump P3, which may be a liquid dosing pump, connected to the diluent vessel 128 may feed desired amount of cold diluent volumetrically or by mass into the product flow path F5 via a tee connection 129 at the upstream of the outlet 109C of the CFR module 104. Next to the tee connection 129, the quenching unit 120 may also comprise a temperature sensor T2 or transmitter coupled with the thermostat H4A via the control module 122 so that the final temperature of diluted flowing core shell solution may be adjusted by changing the temperature of the diluent in the diluent vessel 128. Accordingly, the core shell solution C1 can be cooled down and diluted to a predefined sufficiently low temperature and concentration instantly while collected as the final product in a product tank 130.

Figure 3:
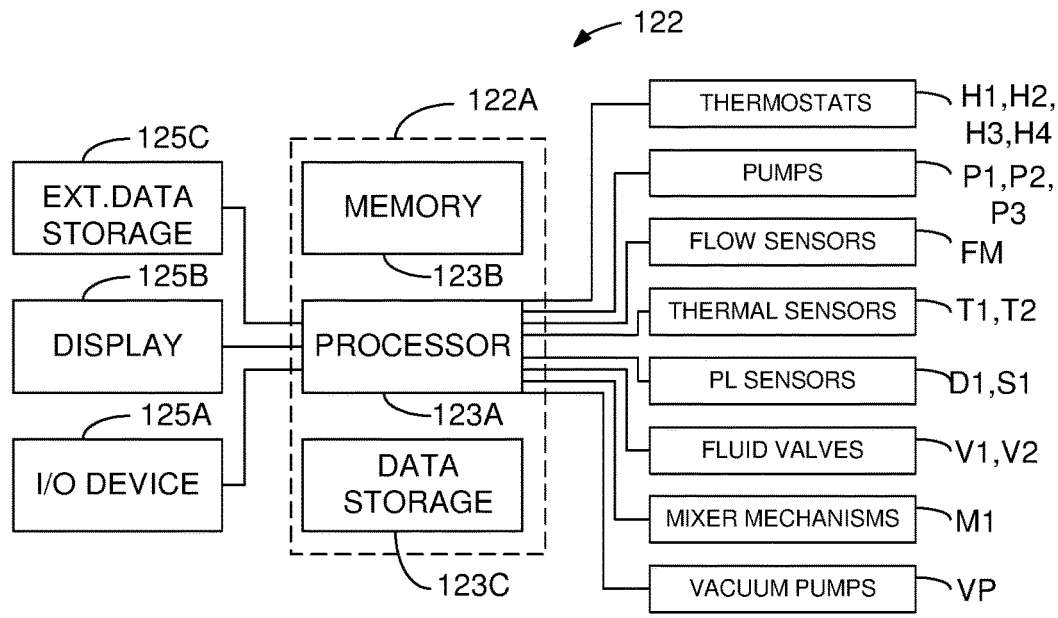
FIG. 3 is a schematic view of an embodiment of a control unit of the automated continuous flow reactor system.

Referring to FIGS. 1 and 3, the control module 122 or automation module of the CFR system 100 may include a control unit 122A, such as a computer or server. All the processing and monitoring equipment described above may be connected to the control unit 122A and controlled and run via a control software or program in a full automated fashion. The control software may use a process recipe input comprising predefined values for all available process parameters and process conditions to run processes in the CFR system 100. In order to provide full automation, the CFR system 100 may also use a plurality of actuated valves which may be controlled (open/close) via the control software using the process recipe. The actuated valves may control the precursor solution flow and any other solution flows in the CFR system. The control module 122 may be connected, electrically or wirelessly, to the following exemplary system devices for controlling operations of the CFR system 100: the heaters or thermostats H1A-H1D, H2A-H2D, H3A-H3E and H1A; the mixers M1A-M1D; the pumps P1A-P1D, P2A-P2D and P3; the thermal transmitters or thermal sensors T1A-T1D and T2; the mass flow meters FMA-FMD; the fiber probes D1A-D1E; the photoluminescence detectors S1A-S1E and, the valve V1, and other devices, such as vacuum pumps, oxygen sensors, pressure sensors, and the like to control the process.

As illustrated in FIG. 3, the control unit 122A may be configured as a computer including a processor (Central Processing Unit) 123A, a memory 123B for short term data storage, such as a RAM, and a data storage device 123C for long term data storage. The memory 123B and the data storage device 123C may be configured to exchange data with the processor 123A via an internal bus. An exemplary data storage device 123C may be an HDD, a flash memory, or the like. An input-output (I/O) device 125A, for example, a mouse, keyboard and a touch pad or the like, a display 125B or screen and, an optional external data storage 125C may be connected to the control unit 122A. The external data storage 125C may include alternative or additional process recipes or programs that may be used by the processor 123A for a process. The programs may be also supplied using a data communication system such as the Internet or a dedicated line.

The control program for controlling the operations of the CFR system 100 may be readily stored in the data storage device 123C. The control unit 122A may run the control program to execute each step in the core shell synthesis process to obtain the predetermined process results. The processor 123A may be connected, electrically or wirelessly, to the following exemplary system devices for controlling operations of the CFR system 100: the heaters or thermostats H1A-H1D, H2A-H2D, H3A-H3E and H1A; the mixer assemblies M1A-M1D; the fluid pumps P1A-P1D, P2A-P2D and P3; the thermal transmitters or thermal sensors T1A-T1D and T2; the mass flow meters FMA-FMD; the fiber probes D1a-D1E; the photoluminescence detectors S1A-S1E and, the actuated valves V1 and V2, and other devices, such as vacuum pumps, oxygen sensors, pressure sensors, and the like to control the process.

The processor 123A may be configured to read and execute the control program from the data storage 123C and controls the operation of the above mentioned devices or components of the CFR system 100 according to contents of the read process recipe. The data storage device 123C or the data storage device 125C may be configured as a non-transitory computer-readable recording medium. Such storage mediums for supplying and storing the program may be referred to as a recording medium. The term "recording medium" may refer to the data storage device 123C or the external data storage device 125C, or both the data storage device 123C and the external data storage device 125C.

Figure 4:
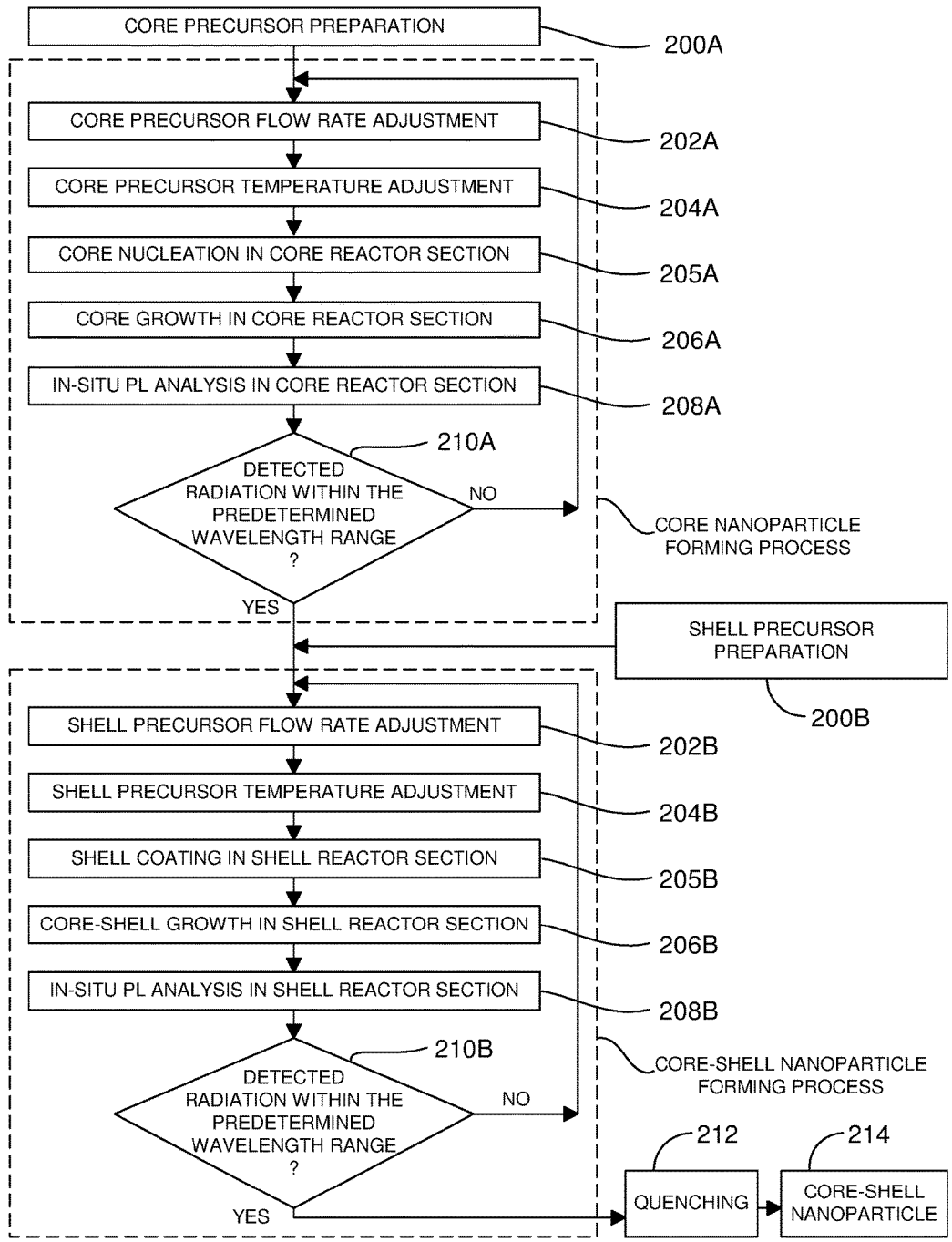
FIG. 4 is an exemplary process flow of photoluminescent nanoparticle manufacturing in an embodiment of the present invention.

FIG. 4 is a flowchart illustrating an exemplary continuous process of forming core shell nanoparticles in the CFR system 100 (FIG. 1). Referring to FIG. 4, in a core precursor preparation step 200A and in a shell preparation step 200B the core precursors and the shell precursors may be prepared as described with respect to the FIGS. 1, 2A and 2B.

Accordingly, the core precursor solutions A1 and A2 prepared in the core precursor preparation step 200A may be delivered to the continuous flow reactor module 104 via the precursor flow paths F1 and F2, thereby mixed. Next, an exemplary core nanoparticle forming process or synthesis may be performed. In step 202A, flow rate of the core precursors may be adjusted or maintained using the pumps P2A and P2B based on the flow rate provided by the mass flow meters FMA and FMB so that the core precursors may have the desired flow rate. In step 204A, temperature of the core precursors may be adjusted using the heaters H2A, H2B and H3A, based on the temperature data provided by the temperature sensors T1A and T1B, so that the core precursors and/or the core solution may have the required temperature. In step 205A, core nanoparticles may nucleate in the flow reactor 108A. In step 206A, core nanoparticles may grow in the flow reactors 108B-108C (core reactor section). In step 208A, photoluminescence analysis of the core nanoparticles may be performed, using the photoluminescence detectors D1A-D1C and photoluminescence detectors S1A-S1C, as the core nanoparticles nucleate and grow so as to determine, in step 210A, whether the core particle size is in a predetermined size range. Based on this determination in step 210A, the flow rates in step 202A and temperatures in step 204A may be adjusted or maintained. The steps 202A-208A may be repeated a plurality of times until the predetermined core nanoparticle size is obtained.

After forming the core nanoparticles in the flow reactors 108A-108C, the core shell solution A3 carrying the core nanoparticles may exit the third flow reactor 108C and may enter the fourth flow reactor 108D. Accordingly, the shell precursor solutions B1 and B2 prepared in the shell precursor preparation step 200B may also be delivered to the fourth flow reactor 108D via the precursor flow paths F3 and F4, thereby mixed with the core solution A3. Next, an exemplary core shell nanoparticle forming process or synthesis performed in the flow reactors 108D and 108E (shell reactor section) of the continuous flow reactor module 104.

In step 202B, flow rate of the shell precursors may be adjusted or maintained using the pumps P2C and P2D based on the flow rate data provided by the mass flow meters FMC and FMD so that the shell precursors may have the desired flow rate. In step 204B, temperature of the shell precursors may be adjusted or maintained using the heaters H2C and H2D based on the temperature data provided by the temperature sensors T1C and T1D, so as to meet the temperature of the flow reactor 108D, whose temperature is adjusted or maintained using the heater H3D, so that the shell precursors and/or the core shell solution may have the required temperature. In step 205B, shell coating on the core nanoparticles may begin in the flow reactor 108D. In step 206B, shell growth may take place on the core nanoparticles to form core shell nanoparticles in the flow reactor 108E.

In step 208B, photoluminescence analysis of the core nanoparticles may be performed, using the photoluminescence detectors D1D-D1E and photoluminescence detectors S1D-S1E, as the core shell nanoparticles form and grow so as to determine, in step 210B, whether the core shell nanoparticle size is in a predetermined size range. Based on this determination in step 210A, the flow rates in step 202B and temperatures in step 204B may be adjusted or maintained. The steps 202B-208B may be repeated a plurality of times until the predetermined core shell particle size is obtained. After forming the core shell nanoparticles in the flow reactors 108D-108E, the core shell solution C1 carrying the core shell nanoparticles may exit the fifth flow reactor 108E and may enter the quenching module 120 and the final product photoluminescent core shell nanoparticles are collected in the product tank 130.

Figure 5:
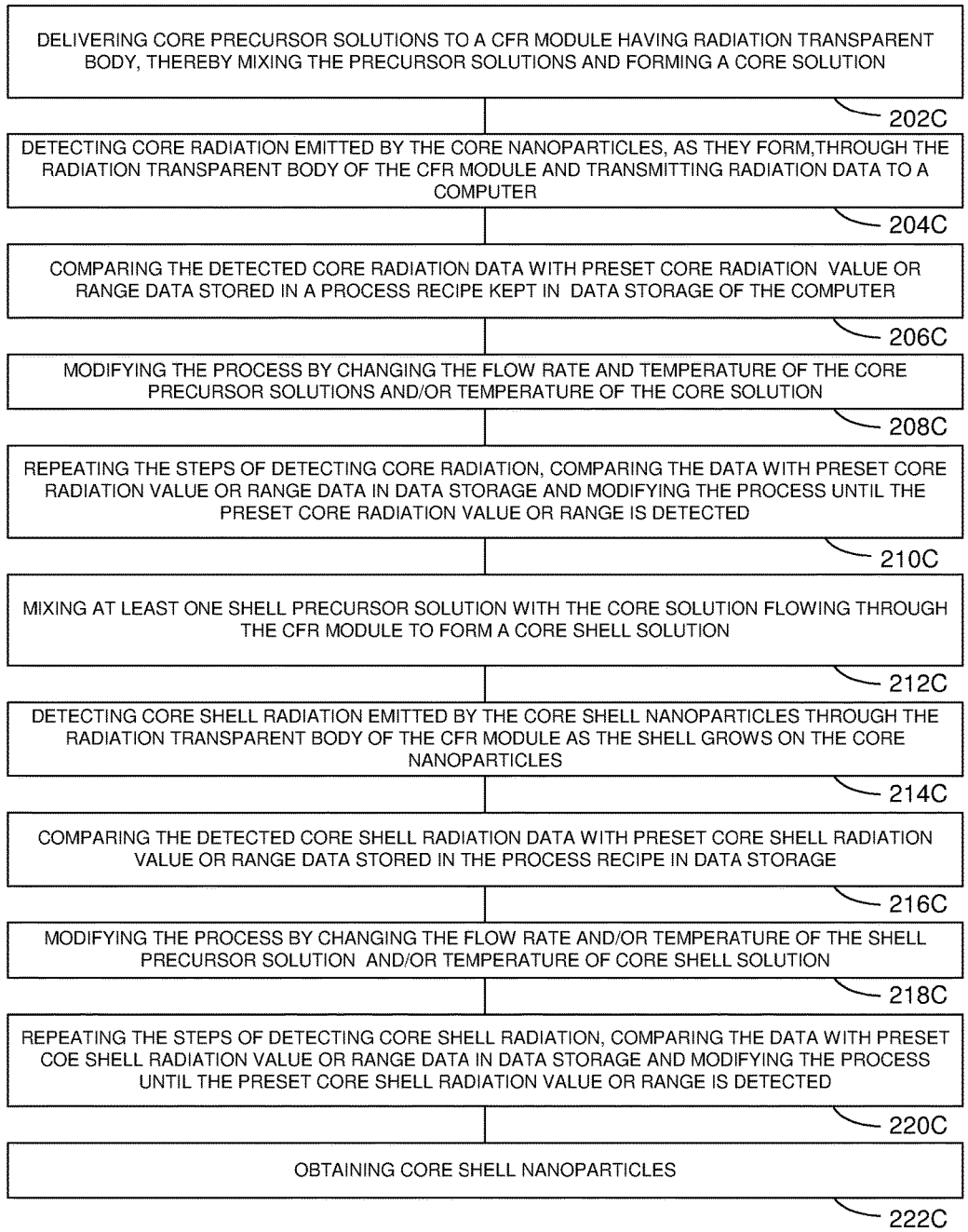
FIG. 5 shows an exemplary process according to one or more embodiments.

FIG. 5 is a flowchart illustrating an exemplary process of the present invention. In the following description, an operation of each component in the CFR system 100 may be controlled by the control module 122 (FIG. 3). Accordingly, in process step 202C, core precursor solutions, including core precursor materials, may be delivered to the radiation transparent body of the CFR module 104 (FIG. 1) to mix them and form a core solution. In process step 204C, core radiation emitted by the core nanoparticles, as they form within the core solution, may be detected by photoluminescence detectors S1A-S1C and through the radiation transparent body of the CFR module 104 and transmitted to the control unit 122A (FIG. 3).

In process step 206C, the control unit 122A may compare the core nanoparticle radiation data from the photoluminescence detectors S1A-S1C and a predetermined core nanoparticle radiation value or range stored in the data storage 123C (FIG. 3). The predetermined core nanoparticle radiation range may correspond to a predetermined target size of the core nanoparticle. In process step 208C, depending on the determination made in the previous step 206C, the process conditions may be modified by adjusting or maintaining the flow rate and the temperature of the core precursor solution, and the temperature of the core solution, to continue nanoparticle growth to obtain the predetermined radiation value or range. Based on the comparison result in process step 206C and the flow rate data detected by the mass flow meters FMA and FMB, the core precursor solution flow rate may be adjusted or maintained by running pumps P2A and P2B. Based on the comparison result in process step 206C and the temperature data detected by the thermal sensors T1A and T1B, the core precursor solution temperature, and core solution temperature may be adjusted or maintained by running thermostats H2A and H2B, and thermostats H3A-H3C, respectively. In process step 210C, the steps 204C-208C may be repeated until the predetermined core nanoparticle radiation value or range is detected.

In process step 212C, at least one shell precursor solution, including at least one shell material, may be mixed with the core solution including the core nanoparticles having the predetermined size to form a core shell solution within the radiation transparent body of the CFR module 104. In process step 214C, radiation emitted by the core shell nanoparticles, as they form within the core shell solution, may be detected by photoluminescence detectors D1 and through the radiation transparent body of the CFR module 104 and transmitted to the control unit 122A. In process step 216C, the control unit 122A may compare the core shell nanoparticle radiation data from the photoluminescence detectors D1 and a predetermined core shell nanoparticle radiation range stored in the data storage 123C. The predetermined core shell nanoparticle radiation value or range may correspond to a target predetermined size of the core shell nanoparticle.

In process step 218C, depending on the determination made in the previous step 216C, the process conditions may be modified by changing the flow rate and temperature of the shell precursor solution and, the temperature of the core shell solution. Based on the comparison result in process step 216C and the flow rate data detected by the mass flow meters FMC and FMD, the shell precursor solution flow rate may be adjusted or maintained by running pumps P2C and P2D. Based on the comparison result in process step 216C and the temperature data detected by the thermal sensors T1C and T1D, the shell precursor solution temperature, and core shell solution temperature may be adjusted or maintained by running thermostats H2C and H2D, and thermostats H3D-H3E, respectively. In process step 220C, the steps 214C-218C may be repeated until the predetermined core shell nanoparticle radiation value or range is detected. In process step 222C, a core shell nanoparticle having a predetermined size may be obtained as a product.

Figure 6:
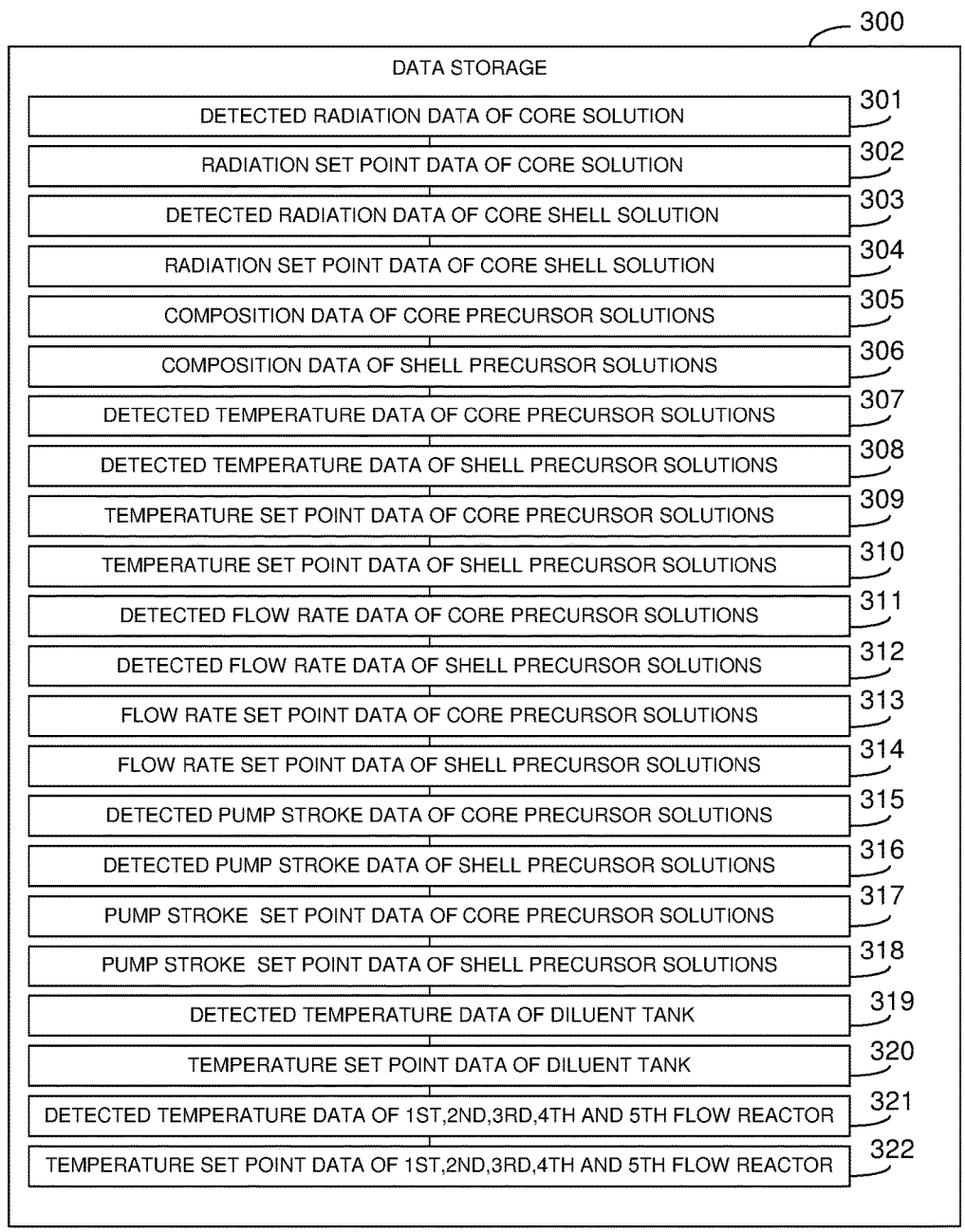
FIG. 6 shows an exemplary data storage usable with the control unit of the system.

FIG. 6 shows a data storage 300 which may be part of the data storage 123C which is in communication with the processor 123A. The data storage 300 may include: "Detected radiation data of core solution" 301; "Radiation set point data of core solution" 302; "Detected radiation data of core shell solution" 303; "Radiation set point data of core shell solution" 304; "Composition data of core precursor solutions" 305; Composition data of "shell precursor solutions" 306; Detected temperature data of core precursor solutions 307; "Detected temperature data of shell precursor solutions" 308; "Temperature set point data of core precursor solutions" 309; "Temperature set point data of shell precursor solutions" 310; "Detected flow rate data of core precursor solutions" 311; "Detected flow rate data of shell precursor solutions" 312; "Flow rate set point data of core precursor solutions" 313; "Flow rate set point data of shell precursor solutions" 314; "Detected pump stroke data of core precursor solutions" 315; "Detected pump stroke data of shell precursor solutions" 316; "Pump stroke set point data of core precursor solutions" 317; "Pump stroke set point data of shell precursor solutions" 318; "Detected temperature data of diluent tank" 319; "Temperature set point data of diluent tank" 320; "Detected temperature data of $1^{st}$, $2^{nd}$, $3^{rd}$, $4^{th}$ and $5^{th}$ flow reactors" 321; and, "Temperature set point data of $1^{st}$, $2^{nd}$, $3^{rd}$, $4^{th}$ and $5^{th}$ flow reactors" 322.

Figure 7A:
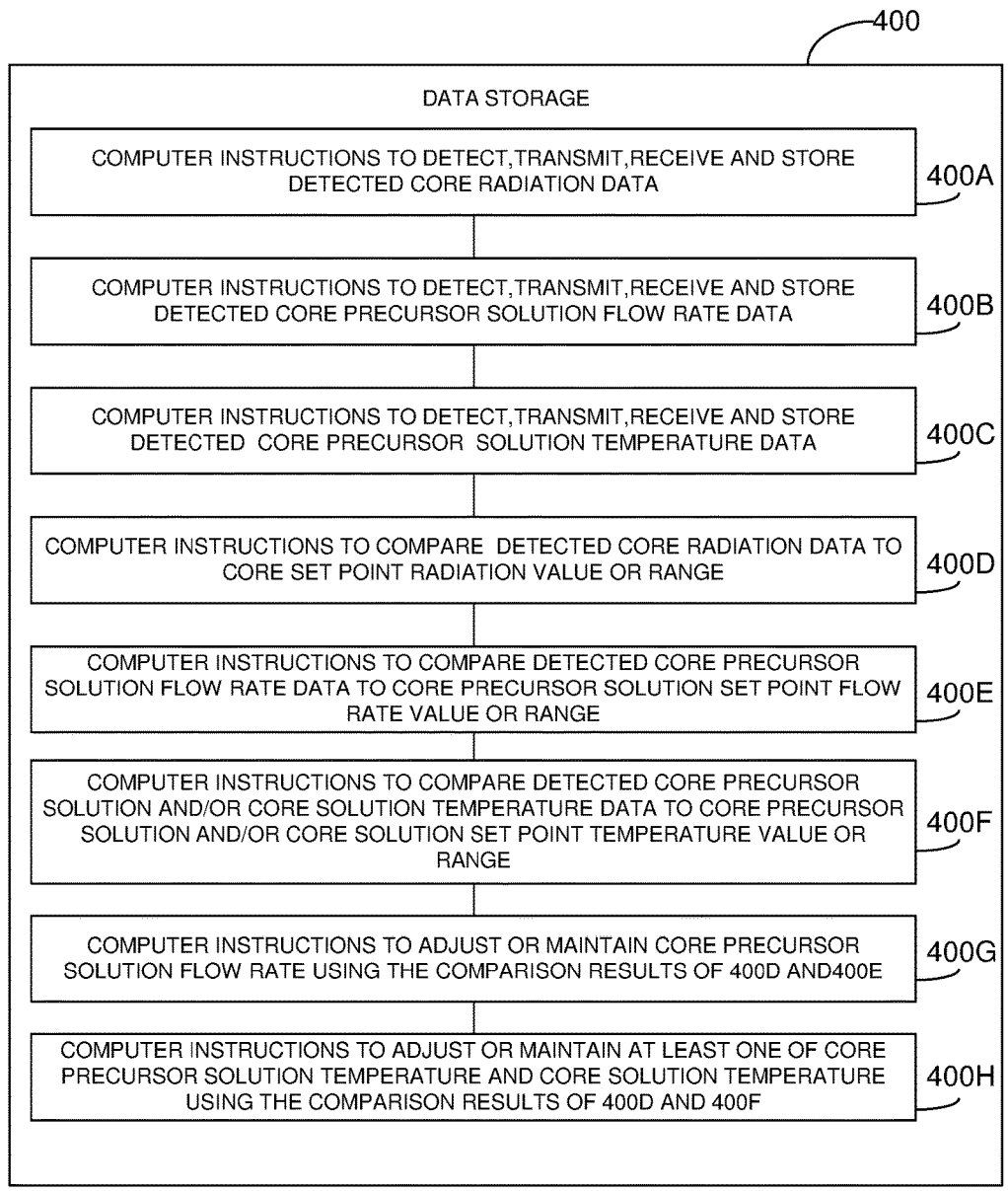
FIGS. 7A-7B show exemplary data storages including computer instructions usable with the control unit of the system.
Figure 7B:
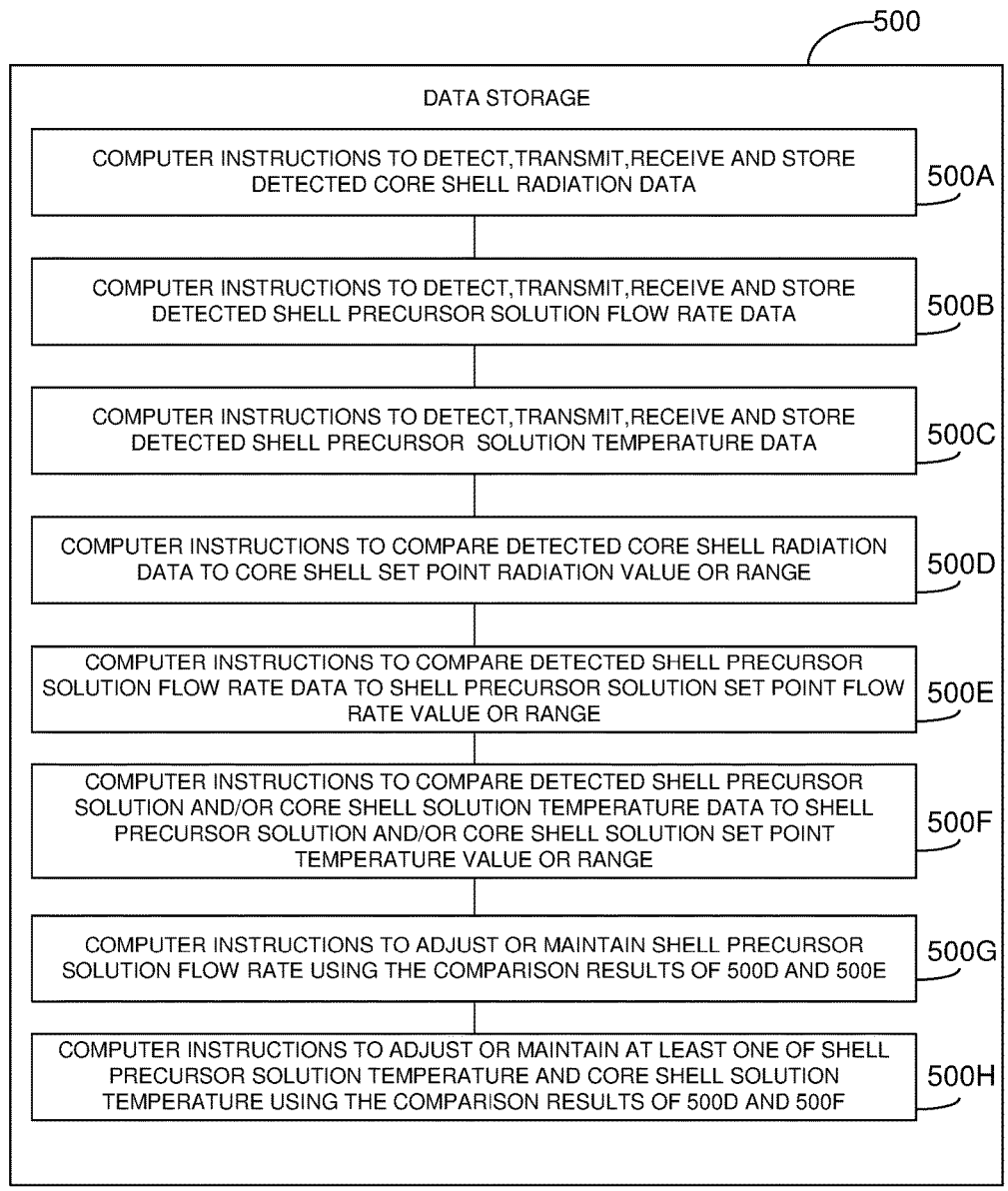

FIGS. 7A and 7B show data storages 400 and 500 with stored computer instructions. The data storages 400 and 500 may be part of the data storage 123C which is in communication with the processor 123A. Referring to FIG. 7A, accordingly data storage 400 may include computer instructions including: "Computer instructions to detect, transmit, receive and store detected core radiation data" 400A; "Computer instructions to detect, transmit, receive and store detected core precursor solution flow rate data" 400B; "Computer instructions to detect, transmit, receive and store detected core precursor solution temperature data" 400C; "Computer instructions to compare detected core radiation data to core radiation set point value or range data" 400D; "Computer instructions to compare detected core precursor solution flow rate data to core precursor solution set point flow rate value or range data" 400E; "Computer instructions to compare detected core precursor solution and/or core solution temperature data to core precursor solution and/or core solution set point temperature value or range data" 400F; "Computer instructions to adjust or maintain core precursor solution flow rate using the comparison results of 400D and 400E" 400G; and, "Computer instructions to adjust or maintain at least one of core precursor solution temperature and core solution temperature using the comparison results of 400D and 400F" 400H.

Referring to FIG. 7B, accordingly data 500 may have computer instructions including: "Computer instructions to detect, transmit, receive and store detected core shell radiation data" 500A; "Computer instructions to detect, transmit, receive and store detected shell precursor solution flow rate data" 500B; "Computer instructions to detect, transmit, receive and store detected shell precursor solution temperature data" 500C; "Computer instructions to compare detected core shell radiation data to core shell radiation set point value or range data" 500D; "Computer instructions to compare detected shell precursor solution flow rate data to shell precursor solution set point flow rate value or range data" 500E; "Computer instructions to compare detected shell precursor solution and/or core shell solution temperature data to shell precursor solution and/or core shell solution set point temperature value or range data" 500F; "Computer instructions to adjust or maintain shell precursor solution flow rate using the comparison results from 500D and 500E" 500G; and, "Computer instructions to adjust or maintain at least one of shell precursor solution temperature and core shell solution temperature using the comparison results from 500D and 500F" 500H.

In an exemplary process in the CFR system 100 shown in FIG. 1, the core and shell precursor batch reactors may be loaded with the precursor reagents by an operator. Operations comprising the dissolution of the precursor source material in a preferred solvent and addition of other precursor reagents such as ligand and/or other materials such as catalysts, stabilizers, viscosity modifiers, and etc. may be performed batch wise at predetermined temperatures. The precursor solutions in the batch reactors 114 may not be transferred to the dosing vessels 116 until they are ready for the nanoparticle reaction which will occur in the flow reactors 108. If the precursor solution in the batch reactors 108 is to be transferred into the dosing vessels 116 that already contain precursor solution during a continuing manufacturing process, this precursor solution must have all the same chemical and physical characteristics as the ready-to-dose precursor solution in the dosing vessel. Accordingly, one of the advantages of the present invention is that although the preparation of precursor mixture is done batch wise, dosing of the precursors into the flow reactors 108 is never interrupted, providing a continuous production capability to the CFR system 100.

In an exemplary process in the CFR system 100 shown in FIG. 1, a process recipe file may be formed by the operator and entered to the control software or program. The recipe file comprises all the predefined values or ranges for the reaction parameters, and once the software is run, the production process may run continuously until at least one of the precursors is completely used by the process, which is detected by the mass flow meter. One of the predefined values in the stored process recipe may be the mass flow rate of each precursor at the dosing lines.

The control software may run the liquid dosing pumps by adjusting or maintaining the pump stroke to match the value measured by the mass flow meters with the predefined value in the process recipe. The volumetric dosing rate of the liquid dosing pump is may also be in the recipe. Another predefined value in the recipe may be the temperatures used during the process. The control software adjusts or maintains the heating or cooling power of the thermostats to match the values measured by the corresponding temperature sensors on the precursor flow lines with the predefined values in the recipe. The temperature of the thermostats equipped at the flow reactors may also be adjusted accordingly.

In an exemplary process in the CFR system 100 shown in FIG. 1, the relative magnitudes of the mass flow rates at each precursor flow path F1, F2, F3 and F4 may determine the stoichiometry between the reacting species of the first core precursor and the second core precursor and/or the first shell precursor and the second shell precursor, at given precursor solution properties (e.g. reagent concentrations) in the dosing vessels. The total mass flow rate resulting from the combination of the first core precursor and the second core precursor may determine the residence time, thus the reaction time allowed for the nanoparticle core growth at a given flow reactor volume and number. The total mass flow rate resulting from the combination of the first shell precursor, the second shell precursor and the core solution determines the residence time, thus the reaction time allowed for the nanoparticle shell coating at a given flow reactor volume and number. The overall total mass flow rate determines the production capacity of the reactor for a given process parameter set.

In an exemplary process in the CFR system 100 shown in FIG. 1, the temperatures set for the flow reactors 108 determines the rate of nanoparticle core nucleation, core growth, shell coating and shell growth in the flow reactors 108. For instance, a fast nucleation can be achieved at relatively high temperatures applied at the first flow reactor 108A, followed by a lower temperature for homogeneous growth in the second flow reactor 108B and followed by a certain temperature in the third flow reactor 108C to adjust the desired core nanoparticle size. A predetermined temperature may be applied at the fourth flow reactor 108D to initiate a homogenous shell coating, followed by a same or different temperature at the fifth flow reactor 108E to adjust the shell size or shell layer thickness. The applied temperatures may be adjusted or maintained depending on the type and kinetic properties of the used shell precursors.

For consecutive productions where different recipes are run to produce different type of nanoparticles, for example, from the same starting precursor, the device of invention has the capability to separate the output as product or waste via an algorithm that uses the photoluminescence data measured by the optical fiber photoluminescence detectors S1A-S1E to determine the intervals corresponding to a steady state or a transition due to parameter change after the initiation of a new recipe. For the production of nanoparticles having photoluminescence wavelengths within the visible and NIR spectrum, each core and shell precursors may be fed into flow reactors operating at a temperature range between 30 and 200° C. with a flow rate range between 15 and 750 g/min, depending on the nanoparticle reaction kinetics and the total volume of the corresponding reactors.

In one example, for the production of a particular core shell nanoparticle such as PbS/CdS core shell nanoparticle, each core precursor is fed into the first flow reactor operating at 70 to 90° C. with a 20 to 40 g/min flow rate and proceeds with a 40 to 80 g/min total flow rate towards the second, and then third adjacent reactors operating both at 50 to 70° C., to form the core solution carrying the desired core nanoparticles, having photoluminesce maximum wavelength of 950 to 1050 nm. Each of the shell precursors is fed into the fourth reactor operating at 50 to 70° C. with 50 to 70 g/min flow rate. The shell precursors and the core solution flowing from the third reactor carrying the core nanoparticles mix in the fourth reactor to start the formation of the shell coating on the core nanoparticles and flow towards the fifth reactor operating at 40 to 60° C. with a total flow rate 140 to 220 g/min. The final solution coming out of the last reactor is mixed with a cold solvent flowing with a rate between 720 and 1200 ml/min, to give the final, quenched core-shell nanoparticle solution between 15 and 25° C. having photoluminesce maximum wavelength between 850 and 950 nm.

In another example, for the production of another particular core shell nanoparticle such as PbS/CdS core shell nanoparticle, each core precursor is fed into the first flow reactor operating at 60 to 90° C. with a 40 to 80 g/min flow rate and proceeds with a 80 to 160 g/min total flow rate towards the second, and then third adjacent reactors operating both at 40 to 70° C., to form the core solution carrying the desired core nanoparticles, having photoluminesce maximum wavelength of 800 to 900 nm. Each of the shell precursors is fed into the fourth reactor operating at 60 to 80° C. with 100 to 140 g/min flow rate. The shell precursors and the core solution flowing from the third reactor carrying the core nanoparticles mix in the fourth reactor to start the formation of the shell coating on the core nanoparticles and flow towards the fifth reactor operating at 60 to 80° C. with a total flow rate 180 to 440 g/min. The final solution coming out of the last reactor is mixed with a cold solvent flowing with a rate between 1440 and 2400 ml/min, to give the final, quenched core-shell nanoparticle solution between 15 and 25° C. having photoluminesce maximum wavelength between 700 and 800 nm.

Figure 8:
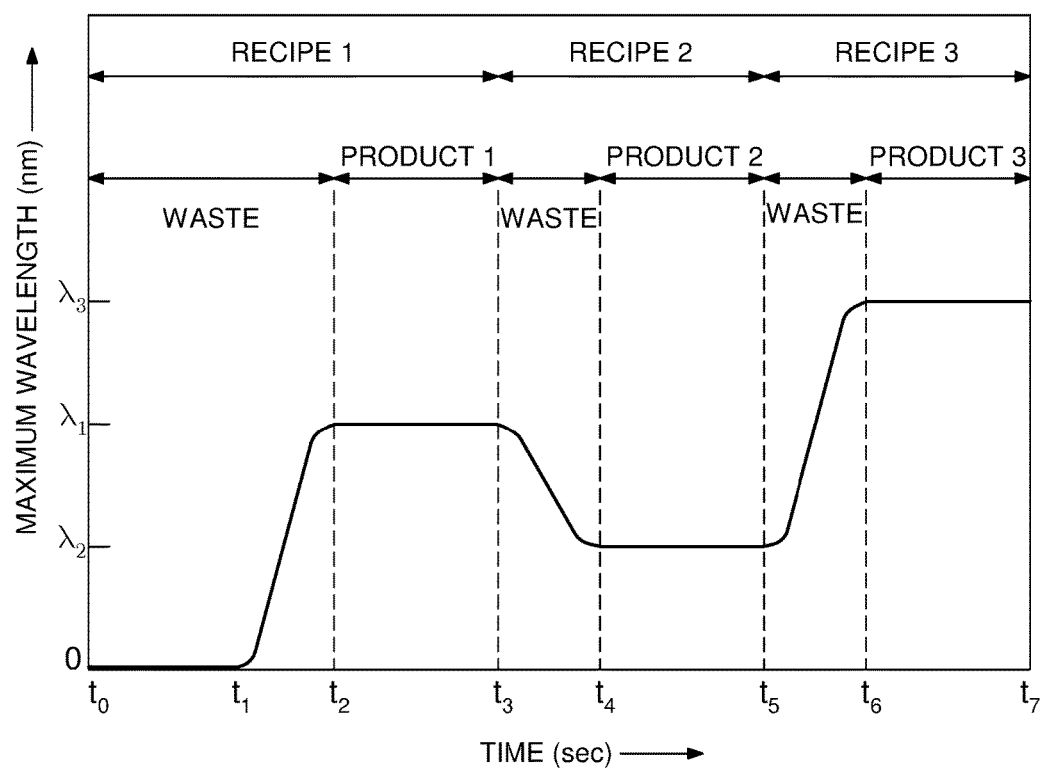
FIG. 8 is a graph showing working principle for the self-determining of process intervals for collecting products corresponding to different process recipes consecutively run in a single production using a photoluminescence analysis system.

FIG. 8 demonstrates the change of photoluminescence maximum wavelength $\lambda$ for three products, such as $\lambda_1$ for a product denoted as product 1, $\lambda_2$ for a product denoted as product 2 and $\lambda_3$ for a product denoted as product 3, for a set of three different production recipes labelled as recipe 1, recipe 2 and recipe 3, consecutively. In this embodiment photoluminescence is the radiation detected from the particles and the photoluminescence maximum wavelength may be defined as the maximum wavelength generated at the maximum radiation intensity generated by the nanoparticle core or core shell structure. Here, the radiation or the light may be photoluminescence radiation. Upon the initiation of a master recipe file comprising the corresponding recipes, the computer software starts the production of product 1 according to entered process set values in the file between $t_0$-$t_1$ time interval. The photoluminescence maximum wavelength λ measured by the optical fiber photoluminescence detectors S1A-S1E at this interval may be continuously monitored. The photoluminescence maximum wavelength λ before the start of the reaction is zero since no nanoparticle exists in any of the flow reactors. This zero-photoluminescence may continue after initiation of the recipe 1 since dosing of precursors does not start until the thermostats bring the temperature of each corresponding process unit to the set value in the process recipe. The photoluminescence detectors start to measure values when dosing of the precursors start and a transition regime shown between $t_1$-$t_2$ time interval, defined as a state of change in the photoluminescence maximum wavelength λ, is observed by the photoluminescence detectors.

The control software keeps the waste valve open at the terminal side of the process. When the CFR system enters steady state, all the flows, temperatures, pressures and etc. settle, and the software determines this steady state as a constant value regime in the photoluminescence maximum wavelength $λ_1$ at $t_2$-$t_3$ time interval. Accordingly, the waste valve is closed and the product valve is opened automatically to collect the product 1 of recipe 1. When the amount of product 1 to be collected is reached as pre-defined amount in the recipe, the product valve is closed, the waste valve is opened and the new set values for the process parameters are initiated according to recipe 2 is run to produce the product 2. A new transition state starts at $t_3$-$t_4$ time interval until the set values are reached. When the CFR system enters a new steady state corresponding to the new set values, the software again determines this steady state as a constant value regime in the photoluminescence maximum wavelength 2, the waste valve is closed and the product valve is opened automatically to collect the product 2 of recipe 2 for $t_4$-$t_5$ time interval according to amount defined in the recipe. If a third or more recipes exist in the master recipe, the control software runs the process accordingly for a new transition state at $t_5$-$t_6$ time interval and a new steady state at $t_5$-$t_6$ time interval for product 3 with the photoluminescence maximum wavelength $λ_3$ as described for recipe 1/product 1 and recipe 2/product 2.

In summary, the present invention provides a flow reactor system for the continuous synthesis of nanocrystals in dynamic flow environments. In one embodiment, the flow reactor and the reaction flow path, where the synthesis takes place, may be made of a transparent material, such as glass, so as to monitor every stage of the entire synthesis process as nanocrystals flow through the reaction flow path. The employment of glass flow modules having non-linear channel geometry may provide advantages by ensuring efficient mixing during the whole reaction compared to prior art's tubular coil reactors having plain interior geometry. The employment of glass flow modules may further allow the collection of photoluminescence data via the optical fiber photoluminescence detectors directly from the reactor surface without the need of flow cells for a probe immersion. The ability to collect photoluminescence data directly from the reactor surface may also provide a flexibility to perform on-line measurements from any desired location along the reaction flow path.

Further, the present invention provides a monitoring module using photoluminescence detectors together with a spectroscopic analyzer to detect radiation emitted from the nanocrystals in their formation stages, as the nanocrystals flow within the reaction flow path. The emitted radiation transmitted through the transparent walls of the reactor and received or detected by the detector, which is different than the prior art techniques using probes to physically immerse or contact the precursor or taking samples for a spectroscopic analysis. Such physically disruptive techniques may cause changes in the flow dynamics of the chemicals and affect the reaction kinetics, which may result in poor product quality.

Further, the present invention provides a computer control module which may efficiently simultaneously regulate reaction parameters affecting the reaction kinetics, such as temperature and flow rate, based on the input from the photoluminescence detectors so as to improve the product quality while reducing manufacturing cost and minimizing manufacturing loses.

Further, the present invention provides a fully automated system such that all the dosing, mixing and heating components as well as the temperature, pressure and photoluminescence monitoring devices are computer controlled in conjunction with the actuated valves to open and close flow paths. Accordingly, the process can be run continuously based on the predetermined or predefined instructions, thus eliminating any user intervention.

Finally, the system of the invention may include the core and shell precursor modules, dosing units and lines, glass flow reactors for each of the core and shell reactions, a quenching module for terminating the reaction and a computer control (automation) module for the full automation of the process.

Although aspects and advantages of the present invention are described herein with respect to certain preferred embodiments, modifications of the preferred embodiments will be apparent to those skilled in the art. Thus the scope of the present invention should not be limited to the foregoing discussion, but should be defined by the appended claims.

What is claimed is:

1. A continuous flow reactor system for manufacturing photoluminescent nanoparticles, comprising:
    a continuous flow reactor including a first reactor section to form core nanoparticles and a second reactor section to form core shell nanoparticles;
    a first flow channel in the first reactor section of the continuous flow reactor, the first flow channel receiving a core material solution from at least one inlet of the first reactor section to form core nanoparticles therein as the core material solution flows through the first flow channel;
    a second flow channel in the second reactor section of the continuous flow reactor, the second flow channel being coupled to and in fluid communication with the first flow channel to receive the core material solution carrying the core nanoparticles formed in the first reactor section, the second flow channel also receiving a shell material solution from at least one inlet of the second reactor section to allow it to blend with the core material solution to form a core shell material solution from which core shell nanoparticles form as the core shell material solution flows through the second flow channel,
    wherein the continuous flow reactor is made of light transparent material and thus the first and second flow channels in the first and second reactor sections include light transparent walls permitting light to transmit through the light transparent walls;
    a plurality of radiation detectors attached to outer surfaces of the first and second reactor sections to detect, through the light transparent material of the first and second reactor sections, radiation emissions transmitted from the core nanoparticles and the core shell nanoparticles as they form in the first flow channel in the first reactor section and the second flow channel in the second reactor section respectively, the radiation detectors including photoluminescence detectors, wherein the photoluminescence detectors include an assembly of optical fiber probes having multiple attachment points on the outer surface of the continuous flow reactor to collect radiation data in real time from multiple surface locations throughout the first flow channel and the second flow channel of the continuous flow reactor; and an automation module for automatically controlling the manufacturing process using a process recipe, the automation module including a computing device having a non-transitory computer-readable recording medium storing computer instructions and the process recipe, the computing device being configured to be in real-time communication with the radiation detectors to receive core nanoparticle radiation data along the first flow channel in the first reactor section and core shell nanoparticle radiation data along the second flow channel in the second reactor section in order to control the forming of both the core nanoparticles and the core shell nanoparticles in the continuous flow reactor based on the process recipe.

2. The continuous flow reactor system of claim 1 further comprising:

at least one core material supply tank connected to the at least one inlet of the first reactor section with at least one first fluid line to deliver the core material solution to the first flow channel;

at least one first mass flow meter coupled to the at least one first fluid line to detect the flow rate of the core material solution flowing into the first flow channel; and at least one first thermal sensor coupled to the at least one first fluid line to detect the temperature of the core material solution flowing into the first flow channel, wherein the at least one first flow meter and the at least one first thermal sensor are configured to transmit detected flow rate and temperature data to the automation module.

3. The continuous flow reactor system of claim 2 further comprising:

at least one shell material supply tank connected to the at least one inlet of the second reactor section with at least one second fluid line to deliver the shell material solution to the second flow channel;

at least one second mass flow meter coupled to the at least one second fluid line to detect the flow rate of the shell material solution flowing into the second flow channel; and at least one second thermal sensor coupled to the at least one second fluid line to detect the temperature of the shell material solution flowing into the second flow channel, wherein the at least one second flow meter and the at least one second thermal sensor are configured to transmit detected flow rate and temperature data to the automation module.

4. The continuous flow reactor system of claim 3 further comprising:

at least one first supply pump coupled to the at least one first fluid line to transfer the core material solution into the first flow channel, wherein the computing device is configured to control the at least one first supply pump to adjust or maintain the flow rate of the core material solution based on the core nanoparticle radiation data and at least one of the detected flow rate data of the core material solution and the detected flow rate data of the shell material solution; and at least one first thermostat coupled to the at least one first fluid line for applying heat to the core material solution, the computing device is configured to control the at least one first thermostat to adjust or maintain the temperature of the core material solution based on the core nanoparticle radiation data and at least one of the detected temperature data of the core material solution and detected temperature data of the shell material solution.

5. The continuous flow reactor system of claim 4 further comprising:

at least one second supply pump coupled to the at least one second fluid line to transfer the shell material solution into the second flow channel, wherein the computing device is configured to control the at least one second supply pump to adjust or maintain the flow rate of the shell material solution based on the core shell nanoparticle radiation data and at least one of the detected flow rate data of the core material solution and the detected flow rate data of the shell material solution; and at least one second thermostat coupled to the at least one second fluid line for applying heat to the shell material solution, the computing device is configured to control the at least one second thermostat to adjust or maintain the temperature of the core shell material solution based on the core shell nanoparticle radiation data and at least one of the detected temperature data of the core material solution and detected temperature data of the shell material solution.

6. The continuous flow reactor system of claim 1, wherein the first flow channel and the second flow channel include non linear inner wall features continuously affecting flow dynamics of the solutions flowing through the first flow channel and the second flow channel, thereby increasing chemical uniformity of the solutions flowing therethrough.

7. The continuous flow reactor system of claim 5, wherein the computer instructions stored in the non-transitory computer-readable recording medium includes:

computer instructions for detecting core material radiation data from the photoluminescence detectors;

computer instructions for detecting temperature and flow rate data of the core material solution flowing into the first flow channel in the first reactor section;

computer instructions for adjusting the flow rate of the core material solution flowing into the first flow channel, based on the detected core material radiation data and at least one of the detected core material solution flow rate data and the detected shell material solution flow rate data;

computer instructions for adjusting or maintaining the temperature of the core material solution flowing into the first flow channel, based on the detected core material radiation data and at least one of the detected core material solution temperature data and the detected shell material solution temperature data;

computer instructions for detecting core shell material radiation data from the photoluminescence detectors;

computer instructions for detecting temperature and flow rate data of the shell material solution flowing into the second flow channel in the second reactor section;

computer instructions for adjusting or maintaining the flow rate of the shell material solution flowing into the second flow channel, based on the detected core shell material radiation data and at least one of the detected core material solution flow rate data and the detected shell material solution flow rate data; and computer instructions for adjusting or maintaining the temperature of the core shell material solution flowing into the second flow channel, based on the detected core shell material radiation data and at least one of the detected core material solution temperature data and the detected shell material solution temperature data.

8. The continuous flow reactor system of claim 1, wherein a photoluminescence analysis is performed using radiation data obtained from multiple surface locations throughout the first flow channel and the second flow channel of the continuous flow reactor.

9. The continuous flow reactor system of claim 1, wherein the light transparent material is glass.

* * * * *